United States Patent
Luo et al.

(10) Patent No.: US 7,928,172 B2
(45) Date of Patent: Apr. 19, 2011

(54) CATALYST ACTIVATORS, PROCESSES FOR MAKING SAME, AND USE THEREOF IN CATALYSTS AND POLYMERIZATION OF OLEFINS

(75) Inventors: Lubin Luo, Baton Rouge, LA (US); Katherine Wu, Baton Rouge, LA (US); Steven P. Diefenbach, Baton Rouge, LA (US)

(73) Assignee: Albemarle Corporation, Baton Rouge, LA (US)

( * ) Notice: Subject to any disclaimer, the term of this patent is extended or adjusted under 35 U.S.C. 154(b) by 2 days.

(21) Appl. No.: 12/519,254

(22) PCT Filed: Dec. 4, 2007

(86) PCT No.: PCT/US2007/086397
§ 371 (c)(1),
(2), (4) Date: Jun. 15, 2009

(87) PCT Pub. No.: WO2008/076632
PCT Pub. Date: Jun. 26, 2008

(65) Prior Publication Data
US 2010/0093958 A1  Apr. 15, 2010

Related U.S. Application Data

(60) Provisional application No. 60/869,931, filed on Dec. 14, 2006.

(51) Int. Cl.
*C08F 4/64* (2006.01)
*C08F 4/6592* (2006.01)
*B01J 31/14* (2006.01)

(52) U.S. Cl. ........ 526/129; 502/103; 502/120; 502/152; 502/156; 502/167; 502/224; 526/127; 526/143; 526/147; 526/160

(58) Field of Classification Search .................. 502/103, 502/155, 156, 167, 224, 120, 152; 526/143, 526/161, 165, 127, 129, 147, 160
See application file for complete search history.

(56) References Cited

U.S. PATENT DOCUMENTS

| 6,417,302 | B1 | 7/2002 | Bohnen |
| 6,482,902 | B1 | 11/2002 | Bohnen et al. |
| 2005/0245701 | A1 | 11/2005 | Oshima et al. |
| 2006/0166813 | A1 | 7/2006 | Kratzer |

FOREIGN PATENT DOCUMENTS

| EP | 1 300 425 A2 | 4/2003 |
| JP | 6329714 A2 | 11/1994 |
| JP | 2001323009 A2 | 11/2001 |
| WO | 0190112 A1 | 11/2001 |
| WO | 2006124231 A1 | 11/2006 |
| WO | 2007005676 A2 | 1/2007 |
| WO | 2007005921 A2 | 1/2007 |
| WO | 2007076398 A2 | 7/2007 |

OTHER PUBLICATIONS

Russell A. Stapleton, et al; Bulky Aluminum Alkyl Scavengers In Olefin Polymerization With Group 4 Catalysts; Journal Of The American Chemical Society; 2003; p. 9246-9247; vol. 125; American Chemical Society, Washington DC, US.

*Primary Examiner* — Caixia Lu
(74) *Attorney, Agent, or Firm* — James A. Jubinsky (57) ABSTRACT

Compositions useful for activating catalysts for olefin polymerization are-provided. The compositions are derived from at least: a) compound derived from at least (i) carrier having at least one pair of hydrogen bonded hydroxyl groups, (ii) organoaluminum compound, and (iii) Lewis base, such that each of a majority of aluminum atoms in the organoaluminum compound forms chemical bonds with at least two oxygen atoms from the at least one pair of hydrogen bonded hydroxyl groups; and b) Bronsted acid, wherein the molar ratio of the Bronsted acid to the organoaluminum compound is less than or equal to about 2:1.

22 Claims, 3 Drawing Sheets

Figure 1. IR Proton Stretching Region of 150, 200, and 600 °C Calcined Silica

Figure 2. IR Proton Stretching Region of a Supported Activator of This Invention Figure 3. IR Proton Stretching Region of a Final Supported Catalyst of This Invention

CATALYST ACTIVATORS, PROCESSES FOR MAKING SAME, AND USE THEREOF IN CATALYSTS AND POLYMERIZATION OF OLEFINS

BACKGROUND

Partially hydrolyzed aluminum alkyl compounds known as aluminoxanes (AO) are used for activating transition metals for olefin polymerization activity. One such compound, methylaluminoxane (MAO), is a frequently chosen aluminum co-catalyst/activator in the industry. Considerable effort has been devoted to improving the effectiveness of catalyst systems based on use of aluminoxanes, hydroxyaluminoxanes, or modified aluminoxanes for polymerization of olefins. Representative patents and publications in the field of aluminoxane usage include the following: U.S. Pat. No. 5,324,800 to Welborn et al.; U.S. Pat. No. 4,752,597 to Turner; U.S. Pat. Nos. 4,960,878 and 5,041,584 to Crapo et al.; WO 96102580 to Dall'occo, et al.; EP 0 277 003 and EP 0 277 004 to Turner; Hlatky, Turner, and Eckman, *J. Am. Chem. Soc.*, 1989, 111, 2728-2729; Hlatky and Upton, *Macromolecules*, 1996, 29, 8019-8020. U.S. Pat. No. 5,153,157 to Hlatky and Turner; U.S. Pat. No. 5,198,401 to Turner, Hlatky, and Eckman; Brintzinger, et al., *Angew. Chem. Int. Ed. Engl.*, 1995, 34, 1143-1170; and the like. Hydroxyaluminoxane compositions are disclosed in U.S. Pat. Nos. 6,562,991, 6,555,494, 6,492, 292, 6,462,212, and 6,160,145. Despite technological advances, many aluminoxane-based polymerization catalyst activators still lack the activity and/or thermal stability needed for commercial applicability, require commercially unacceptably high aluminum loading, are expensive (especially MAO), and have other impediments to commercial implementation.

U.S. Pat. No. 5,384,299 describes zwitterionic catalyst systems prepared by protolysis from dialkyl-metallocenes and borate anions. WO 91/09882 describes supported cationic metallocene catalysts based on the above-mentioned borate anion, wherein the catalyst system is formed by application of a dialkyl-metallocene compound and a Bronsted-acid, quaternary ammonium compound having a non coordinating anion, tetrakispentafluoroborate, to an inorganic support. The support is modified beforehand by means of a trialkylaluminum compound. One disadvantage of this method of application to a support is that only a small part of the metallocene used is immobilized by physisorbtion on the support material; and, thus, the metallocene is prone to detach from the support surface, which can ultimately lead to reactor fouling.

WO 96/04319 describes a catalyst system in which the borate activator anion is covalently bound to the support material directly through one oxygen atom of the metal oxide support. However, such a catalyst system has a low polymerization activity by commercial standards. Another disadvantage of such a catalyst system is described by Basset et al. (*J. Am. Chem. Soc.*, 128 (2006) 9361). Basset et al. describe catalyst deactivation pathways for such covalently bound (through one oxygen atom of the metal oxide, silica, support) borate activator anions as well as a deactivation pathway involving the reaction of the four member siloxane rings of the silica support (formed by calcination of the silica up to and greater than 600° C.). Deactivation pathways described in publications show the limitations of borate activator anions covalently bound to one oxygen atom of the metal oxide carrier and additionally, the importance of controlling the structures within the metal oxide carrier as a result of calcination.

Thus, there is a need for activator compositions that are stable to deactivation pathways and that exhibit high sustainable activity for commercial olefin polymerizations.

THE INVENTION

This invention meets the above-described needs by providing compositions derived from at least: a) compound derived from at least (i) carrier having at least one pair of hydrogen bonded hydroxyl groups; (ii) organoaluminum compound; and (iii) Lewis base, such that each of a majority of aluminum atoms in the organoaluminum compound forms chemical bonds with at least two oxygen atoms from the at least one pair of hydrogen bonded hydroxyl groups; and b) Bronsted acid, wherein the molar ratio of the Bronsted acid to the organoaluminum compound is less than or equal to about 2:1. This invention also provides methods of preparing compositions comprising combining at least: a) compound derived from at least (i) carrier having at least one pair of hydrogen bonded hydroxyl groups; (ii) organoaluminum compound; and (iii) Lewis base, such that each of a majority of aluminum atoms in the organoaluminum compound forms chemical bonds with at least two oxygen atoms from the at least one pair of hydrogen bonded hydroxyl groups; and b) Bronsted acid, wherein the molar ratio of the Bronsted acid to the organoaluminum compound is less than or equal to about 2:1. Also provided are compositions comprising at least a) Bronsted acidic cation $[Q_mH]^+$, wherein H is a proton, m is 1 or 2, each Q is Lewis base, and each Lewis base Q can be the same as, or different from, any other Lewis base Q; and b) aluminate anion chemically bonded to at least one carrier, wherein each of a majority of aluminum atoms in the aluminate anion is chemically bonded to at least two oxygen atoms on the surface of the carrier, wherein the composition is derived from at least a) compound derived from at least (i) carrier having at least one pair of hydrogen bonded hydroxyl groups, (ii) organoaluminum compound, and (iii) the Qm; and b) Bronsted acid. In such methods and compositions, a majority of the hydroxyl groups on the carrier can be in hydrogen bonded form. This invention also provides such compositions that are suitable for activating an alkylated transition metal component by protonation.

As will be familiar to those skilled in the art, the terms "combined" and "combining" as used herein mean that the components that are "combined" or that one is "combining" are put into a container with each other. Likewise a "combination" of components means the components having been put together in a container. The term "pair of hydrogen bonded hydroxyl groups" as used herein means at least two hydroxyl groups on the carrier that are close enough to interact with each other through hydrogen-oxygen bonding. Also, as used herein, the term "majority" means more than about seventy percent.

CARRIERS/SUPPORTS

Carriers having at least two hydrogen bonded hydroxyl groups, e.g., at least one pair of hydrogen bonded hydroxyl groups, useful in compositions according to this invention comprise inorganic carriers or organic carriers. Such carriers are either non-calcined or low-temperature calcined. As used herein, a "non-calcined" carrier is a carrier that has not purposely been subjected to calcining treatment, and a "low-temperature calcined" carrier is carrier that has been calcined at a temperature up to about 400° C., or about 100° C. to about 400° C., or at about 200° C. The calcination time can be about 1 to about 24 hours. Further, the calcination may be performed in any atmosphere, for example, in an atmosphere of air or an inert gas such as nitrogen, or under a vacuum. We have observed that such non-calcined or low-temperature calcined carriers, e.g., silicas, have an increased concentration of hydrogen bonded hydroxyl groups and a negligible amount of strained siloxane rings. See also M. E. Bartram et al., *J. Phys. Chem.*, 1991, Vol. 95, pp. 4453-4463.

A plurality of carriers can be used as a mixture. A carrier of this invention may be porous and have a micro pore volume of not less than 0.1 ml/g of silica, or not less than 0.3 ml/g. A carrier of this invention may have a micro pore volume of about 1.6 ml/g of silica. The average particle diameter of the carrier may be from about 5 micrometers to about 1000 micrometers, or from about 10 micrometers to about 500 micrometers.

One silica useful in this invention is porous and has a surface area in the range of from about 10 $m^2$/g silica to about 1000 $m^2$/g silica, including the range of about 10 $m^2$/g silica to about 700 $m^2$/g silica, a total pore volume in the range of from about 0.1 cc/g silica to about 4.0 cc/g silica, and an average particle diameter in the range of from about 1.0 micrometers to about 500 micrometers. A silica useful in this invention can have a surface area in the range of from about 50 $m^2$/g to about 500 $m^2$/g, a pore volume in the range of from about 0.5 cc/g to about 3.5 cc/g, and an average particle diameter in the range of from about 15 micrometers to about 150 micrometers. A useful silica may have a surface area in the range of from about 200 $m^2$/g to about 350 $m^2$/g, a pore volume in the range of from about 1.0 cc/g to about 2.0 cc/g, and an average particle diameter in the range of from about 10 micrometers to about 110 micrometers.

An average pore diameter of a typical porous silicon dioxide carrier useful in this invention is in the range of from about 10 angstroms to about 1000 angstroms, or from about 50 angstroms to about 500 angstroms, or from about 175 angstroms to about 350 angstroms. A typical content of hydroxyl groups in carriers of this invention is from about 2.5 mmol OH/g silica to about 4.0 mmol OH/g silica, as determined by titration with triethylaluminum. Most of these active OH groups react readily with triethylaluminum to produce ethane, and this reaction can be used to quantify the concentration of active OH groups on a particular silica. A typical content of hydroxyl groups is from about 0.10 mmol OH/g silica to about 10 mmol OH/g silica, or about 1.0 mmol OH/g silica to about 5.0 mmol OH/g silica, or from about 2.5 mmol OH/g silica to about 4.0 mmol OH/g silica.

Example inorganic carriers that may be useful in this invention include inorganic oxides, magnesium compounds, clay minerals and the like. The inorganic oxides can comprise silica, alumina, silica-alumina, magnesia, titania, zirconia, and clays. Example inorganic oxides useful in this invention include, without limitation, $SiO_2$, $Al_2O_3$, MgO, $ZrO_2$, $TiO_2$, $B_2O_3$, CaO, ZnO, BaO, $ThO_2$ and double oxides thereof, e.g. $SiO_2$—$Al_2O_3$, $SiO_2$—MgO, $SiO_2$—$iO_2$, $SiO_2$—$TiO_2$—MgO. Example magnesium compounds useful in this invention include $MgCl_2$, MgCl(OEt) and the like. Example clay minerals useful in this invention include kaolin, bentonite, kibushi clay, geyloam clay, allophane, hisingerite, pyrophylite, talc, micas, montmorillonites, vermiculite, chlorites, palygorskite, kaolinite, nacrite, dickite, halloysite and the like.

Example organic carriers that may be useful in this invention include acrylic polymer, styrene polymer, ethylene polymer, propylene polymer and the like. Example acrylic polymers that may be useful in this invention include polymers of acrylic monomers such as acrylonitrile, methyl acrylate, methyl methacrylate, methacrylonitrile and the like, and copolymers of the monomers and crosslinking polymerizable compounds having at least two unsaturated bonds. Example styrene polymers that may be useful in this invention include polymers of styrene monomers such as styrene, vinyltoluene, ethylvinylbenzene and the like, and copolymers of the monomers and crosslinking polymerizable compounds having at least two unsaturated bonds. Example crosslinking polymerizable compound having at least two unsaturated bonds include divinylbenzene, trivinylbenzene, divinyltoluene, divinylketone, diallyl phthalate, diallyl maleate, N,N'-methylenebisacrylamide, ethylene glycol dimethacrylate, polyethylene glycol dimethacrylate and the like.

Organic carrier useful in this invention has at least one polar functional group. Examples of suitable polar functional groups include primary amino group, secondary amino group, imino group, amide group, imide group, hydrazide group, amidino group, hydroxyl group, hydroperoxy-group, carboxyl group, formyl group, methyloxycarbonyl group, carbamoyl group, sulfo group, sulfino group, sulfeno group, thiol group, thiocarboxyl group, thioformyl group, pyrrolyl group, imidazolyl group, piperidyl group, indazolyl group and carbazolyl group. When the organic carrier originally has at least one polar functional group, the organic carrier can be used as it is. One or more kinds of polar functional groups can also be introduced by subjecting the organic carrier as a matrix to a suitable chemical treatment. The chemical treatment may be any method capable of introducing one or more polar functional groups into the organic carrier. For example, it may be a reaction between acrylic polymer and polyalkylenepolyamine such as ethylenediamine, propanediamine, diethylenetriamine, tetraethylenepentamine, dipropylenetriamine or the like. As the specific method of such a reaction, for example, there is a method of treating an acrylic polymer (e.g. polyacrylonitrile) in a slurry state in a mixed solution of ethylenediamine and water at 100° C. or more, for example from 120° C. to 150° C. The amount of polar functional group per unit gram in the organic carrier having a polar functional group may be from 0.01 to 50 mmol/g, or from 0.1 to 20 mmol/g.

Organoaluminum Compounds

Organoaluminum compounds useful in this invention can comprise $AlR_n(XR^1)_{(3-n)}$ wherein Al is aluminum; each R is hydrogen or a hydrocarbyl group having up to about 20 carbon atoms, and each R may be the same as, or different from, any other R; for each $XR^1$, X is a hetero atom and $R^1$ is an organic group bonded to the Al through the hetero atom and having up to about 20 carbon atoms; each $XR^1$ may be the same as, or different from, any other $XR^1$; and n is 1, 2, or 3. Each R can be a straight-chain or branched alkyl group. Non-limiting examples of R include alkyl groups having from 1 to about 10 carbon atoms such as methyl, ethyl, n-propyl, isopropyl, n-butyl, isobutyl, n-pentyl, neopentyl and the like.

Non-limiting examples of $AlR_n(XR^1)_{(3-n)}$ useful in this invention include triethylaluminum, triisobutylaluminum, trimethylaluminum, trioctylaluminum, diisobutylaluminum hydride, diethylaluminum hydride, dimethylaluminum hydride, (2,6-di-tert-butyl-4-methylphenoxy)diisobutylaluminum, bis(2,6-di-tert-butyl-4-methylphenoxy)isobutylaluminum, (2,6-di-tert-butyl-4-methylphenoxy)diethylaluminum, bis(2,6-di-tert-butyl-4-methylphenoxy) ethylaluminum, (2,6-di-tert-butyl-4-methylphenoxy) dimethylaluminum, or bis(2,6-di-tert-butyl-4-methylphenoxy)methylaluminum, (pentafluorophenoxide) dimethylaluminum, bis(pentafluorophenoxide) methylaluminum, (pentafluorophenoxide)diethylaluminum, bis(pentafluorophenoxide)ethylaluminum, and mixtures thereof. Examples of hetero atoms include nitrogen atom, oxygen atom, phosphorous atom, sulfur atom and the like.

Organoaluminum compounds of this invention can be prepared by any suitable method, including currently known methods, as will be familiar to those skilled in the art, or methods that may come to be known.

Lewis Bases

Lewis base can comprise at least one oxygen or one nitrogen donor, or any mixture thereof. Lewis base with oxygen donor includes ethers $R^2_2O$ and alcohols $R^3OH$ or any mixture thereof, wherein $R^2$ in each occurrence is hydrocarbyl group having up to about 20 carbon atoms, and each $R^2$ may be the same as, or different from, any other $R^2$, and wherein $R^3$ in each occurrence is hydrocarbyl group having up to about 20 carbon atoms, and each $R^3$ may be the same as, or different from, any other $R^3$. $R^2$ and $R^3$ can comprise one or more electron withdrawing groups such as F or Cl. For example, Lewis base with oxygen donor can comprise a variety of ethers and alcohols, including, but not limited to t-butylethylether, di-t-butylether, tetrahydrofuran, 2,6-difluorophenol, 4-fluorophenol, pentafluorophenol. Lewis base with nitrogen donor includes primary amine $NH_2R^4$, secondary amine $NHR^4_2$, or tertiary amine $NR^4_3$, or any mixture thereof, wherein $R^4$ in each occurrence is hydrogen or hydrocarbyl group having up to about 20 carbon atoms, and each $R^4$ may be the same as or different from, any other $R^4$. For example, Lewis base with nitrogen donor can comprise a variety of amines, including, but not limited to, $NMe_3$, $NEt_3$, $NMe_2Ph$, $NMe_2(CH_2Ph)$, $NEt_2Ph$, $NEt_2(CH_2Ph)$, or Lewis base can comprise one or more long chain amines such as $NMe(C_pH_{2p+1})(C_mH_{2m+1})$, $NMe_2(C_pH_{2p+1})$, $NEt(C_pH_{2p+1})(C_mH_{2m+1})$, or $NEt_2(C_pH_{2p+1})$, wherein p and m are selected independently from an integer from about 3 to about 20. Examples of long chain amines of the formula $NMe(C_pH_{2p+1})(C_mH_{2m+1})$ include, but are not limited to, compounds such as $NMe(C_{16}H_{33})_2$, $NMe(C_{17}H_{35})_2$, $NMe(C_{18}H_{37})_2$, $NMe(C_{16}H_{33})(C_{17}H_{35})$, $NMe(C_{16}H_{33})(C_{18}H_{37})$, $NMe(C_{17}H_{35})(C_{18}H_{37})$, and the like. For example, $NMe(C_{16}H_{33})_2$ is typically the major species in a commercial long chain amine composition that usually comprises a mixture of several amines. Lewis base may comprise $NMe_2Ph$, $NMe_2(CH_2Ph)$, $NEt_2Ph$, $NEt_2(CH_2Ph)$, $NMe(C_{16}H_{33})_2$. $R^4$ can comprise one or more electron withdrawing groups such as F or Cl, for example, N-isopropyl-4-fluoroaniline.

Bronsted Acids

Bronsted acid, i.e., a compound capable of donating a proton, useful in this invention can comprise $R^5OH$, wherein $R^5$ is an organic compound containing at least one electron withdrawing group. The Bronsted acid can be 2,6-difluorophenol, pentafluorophenol, 4-fluorophenol, or any phenol that is acidic enough to react with any aluminum alkyl group on the organoaluminum compound.

Preparation of Compositions of This Invention

Activator compositions according to this invention can be derived from at least (a) compound derived from at least (i) carrier having at least one pair of hydrogen bonded hydroxyl groups, (ii) organoaluminum compound, and (iii) Lewis base, and (b) Bronsted acid. The carrier can be combined with the organoaluminum compound to form first product; at least a portion of the first product can be combined with the Lewis base to form a second product; and at least a portion of the second product can be combined with the Bronsted acid in amounts sufficient and under condition sufficient to form a Bronsted acidic activator. When the compound is derived from carrier, organoaluminum compound, and Lewis base, the organoaluminum compound can be added in stoichiometric excess, e.g., more than a 1:2 ratio of Al to active OH groups on the carrier, to form a chelating aluminum structure. The Lewis base can remove most of the stoichiometric excess organoaluminum from the carrier surface. The Lewis base and the organoaluminum can then stay in the reaction media, and can be removed by filtration and wash. The resulting material thus has a near maximum chelating aluminum content.

The organoaluminum compound can be combined with Lewis base to form first product, at least a portion of the first product can be combined with the carrier to form second product, and at least a portion of the second product can be combined with the Bronsted acid in amounts sufficient and under condition sufficient to form the Bronsted acidic activator.

This invention provides that the carrier having at least one pair of hydrogen bonded hydroxyl groups, the organoaluminum compound, and the Lewis base can be combined such that the resulting product has a ratio of (mmol SiO on the carrier)/(g carrier) to (mmol aluminum)/(g carrier) from about 1.80:1 to about 2.20:1, or about 1.85:1 to about 2.05:1, or about 2:1. The SiO's are derived from SiOH groups that exist on the carrier prior to the combining.

The combining can be conducted in an inert gas atmosphere; at a temperature from about −80° C. to about 200° C., or from about 0° C. to about 120° C.; the combining time can be from about 1 minute to about 36 hours, or from about 10 minutes to about 24 hours. Solvent used for preparing activator composition can comprise aliphatic solvent or aromatic solvent, either of which is inert to the carrier, the organoaluminum compound, the Lewis base, and the Bronsted acid. Example treatments after completion of the combining operation include filtration of supernatant, followed by washing with inert solvent and evaporation of solvent under reduced pressure or in inert gas flow, but these treatments are not required. Resulting activator composition can be used for polymerization in any suitable state, including fluid, dry, or semi-dry powder, and may be used for polymerization in the state of being suspended in inert solvent. The combining of carrier having at least one pair of hydrogen bonded hydroxyl groups with organoaluminum compound and Lewis base can be conducted at ambient temperature and at a combining time of from about 15 minutes to about 48 hours, or from about 15 minutes to about 6 hours; the resulting combination can be used as is or subsequently heated to a temperature of about 40° C. to about 120° C. Alternatively, the combining of carrier having at least one pair of hydrogen bonded hydroxyl groups with organoaluminum compound and Lewis base can be conducted at a temperature of from about 40° C. to about 120° C. at a combining time of from about 15 minutes to about 6 hours. At least a portion of resulting product is combined with Bronsted acid.

The amount of aluminum atoms in the product, e.g., solid component, obtained by combining carrier having at least one pair of hydrogen bonded hydroxyl groups, organoaluminum compound, and Lewis base can be not less than about 0.1 mmol aluminum atom, or not less than about 1 mmol aluminum atom, in 1 g of the solid component in the dry state. The amount of aluminum atoms in the product is determined by the content of hydroxyl groups on the carrier that are capable of reacting with the organoaluminum compound. For example, hydroxyl groups either under the surface or in relatively small pores of the carrier may not be capable of reacting with the organoaluminum compound; additionally, the bulkiness of the organoaluminum compound can interfere with the ability of certain hydroxyl groups to react with the organoaluminum compound. See, e.g., Example 2-1-3.

Catalysts for Olefin Polymerization

Activator compositions of this invention are useful in catalysts for olefin polymerization. Activator composition according to this invention and transition metal component may each be added independently, yet substantially simultaneously, to monomer to catalyze polymerization. Activator composition and transition metal component may be combined to form product and at least a portion of product may be added to monomer to catalyze polymerization. The active proton ratio of activator composition to transition, metal atom of transition metal component may be 0.1 to 4, or 0.5 to 2, or almost 1.

Activator composition is suitable for activating transition metal component by Bronsted acidity, i.e., by protonating alkylated transition metal component. Activator composition is also suitable for activating transition metal component by Lewis acidity, i.e., by accepting at least one electron pair from transition metal component. The amount of activator composition combined with transition metal component may be sufficient to allow activation of transition metal component predominantly by Bronsted acidity; e.g., 30% or more, 70% or more, or 90% or more of activation may occur due to Bronsted acidity. The amount of activator composition combined with transition metal component may be sufficient to allow activation of transition metal component substantially by Bronsted acidity, e.g., 95% or more, or 98% or more of activation may occur due to Bronsted acidity. Activator composition may be combined with transition metal component either before combining with monomer or while simultaneously combining with monomer. Given a known activator composition and a known transition metal component, one skilled in the art can determine the amount of the activator composition to combine with transition metal component to allow activation predominantly or substantially by Bronsted acidity.

Catalysts for Olefin Polymerization—Transition Metal Component

Transition metal component can comprise any alkylated transition metal component having olefin polymerization potential. For example, without limitation, transition metal component can comprise one or more metallocene transition metal components.

Transition metal component can comprise alkylated catalyst precursor $ML_aR_{q-a}$ (wherein M represents transition metal atom of the 4th Group or Lanthanide Series of the Periodic Table of Elements (1993, IUPAC), and examples thereof include transition metals of the 4th Group of the Periodic Table, such as titanium atom, zirconium atom and hafnium atom and transition metals of the Lanthanide Series, such as samarium; L represents group having cyclopentadienyl skeleton or group having at least one hetero atom, at least one L being group having cyclopentadienyl skeleton, and a plurality of L may be the same or different and may be crosslinked to each other; R represents hydrocarbon group having 1 to about 20 carbon atoms; "a" represents a numeral satisfying the expression $0<a\leq q$; and q represents valence of transition metal atom M).

In L in transition metal component, group having cyclopentadienyl skeleton can comprise, for example, cyclopentadienyl group, substituted cyclopentadienyl group or polycyclic group having cyclopentadienyl skeleton. Example substituted cyclopentadienyl groups include hydrocarbon group having 1 to about 20 carbon atoms, halogenated hydrocarbon group having 1 to about 20 carbon atoms, silyl group having 1 to about 20 carbon atoms and the like. Silyl group according to this invention can include $SiMe_3$ and the like. Examples of polycyclic group having cyclopentadienyl skeleton include indenyl group, fluorenyl group and the like. Examples of hetero atom of the group having at least one hetero atom include nitrogen atom, oxygen atom, phosphorous atom, sulfur atom and the like.

Example substituted cyclopentadienyl groups include methylcyclopentadienyl group, ethylcyclopentadienyl group, n-propylcyclopentadienyl group, n-butylcyclopentadienyl group, isopropylcyclopentadienyl group, isobutylcyclopentadienyl group, sec-butylcyclopentadienyl group, tertbutylcyclopentadienyl group, 1,2-dimethylcyclopentadienyl group, 1,3-dimethylcyclopentadienyl group, 1,2,3-trimethylcyclopentadienyl group, 1,2,4-trimethylcyclopentadienyl group, tetramethylcyclopentadienyl group, pentamethylcyclopentadienyl group and the like.

Example polycyclic groups having cyclopentadienyl group include indenyl group, 4,5,6,7-tetrahydroindenyl group, fluorenyl group and the like.

Example groups having at least one hetero atom include methylamino group, tert-butylamino group, benzylamino group, methoxy group, tert-butoxy group, phenoxy group, pyrrolyl group, thiomethoxy group and the like.

One or more groups having cyclopentadienyl skeleton, or one or more group having cyclopentadienyl skeleton and one or more group having at least one hetero atom, may be crosslinked with (i) alkylene group such as ethylene, propylene and the like; (ii) substituted alkylene group such as isopropylidene, diphenylmethylene and the like; or (iii) silylene group or substituted silylene group such as dimethylsilylene group, diphenylsilylene group, methylsilylsilylene group and the like.

R in transition metal component comprises hydrogen or hydrocarbon group having 1 to about 20 carbon atoms. Examples of R include alkyl group having 1 to about 20 carbon atoms such as methyl group, ethyl group, n-propyl group, isopropyl group, n-butyl group, benzyl group and the like.

Examples of transition metal component $ML_aR_{q-a}$, wherein M comprises zirconium, include bis(cyclopentadienyl)zirconiumdimethyl, bis(methylcyclopentadienyl)zirconiumdimethyl, bis(pentamethylcyclopentadienyl)zirconiumdimethyl, bis(indenyl)zirconiumdimethyl, bis(4,5,6,7-tetrahydroindenyl)zirconiumdimethyl, bis(fluorenyl)zirconiumdimethyl, ethylenebis(indenyl)zirconiumdimethyl, dimethylsilylene(cyclopentadienylfluorenyl)zirconiumdimethyl, diphenylsilylenebis(indenyl)zirconiumdimethyl, cyclopentadienyldimethylaminozirconiumdimethyl, cyclopentadienylphenoxyzirconium dimethyl, dimethyl(tert-butylamino)(tetramethylcyclopentadienyl)silanezirconiumdimethyl, isopropylidene(cyclopentadienyl)(3-tert-butyl-5-methyl-2-phenoxy)zirconiumdimethyl, dimethylsilylene(tetramethylcyclopentadienyl)(3-tertbutyl-5-methyl-2-phenoxy) zirconiumdimethyl and the like.

Additional exemplary transition metal components $ML_aR_{q-a}$ include components wherein zirconium is replaced with titanium or hafnium in the above zirconium components.

Other alkylated catalyst precursors useful in this invention are: rac-dimethylsilylbis(2-methyl-4-phenyl-indenyl)zirconium dimethyl; rac-dimethylsilylbis(2-methyl-1-indenyl) zirconium dimethyl; rac-dimethylsilylbis(2-methyl-4,5-benzoindenyl)zirconium dimethyl; rac-ethylenebis(tetrahydroindenyl)zirconium dimethyl, and rac-ethylenebis(indenyl)zirconiumdimethyl. Alkylated catalyst precursor can be generated in-situ through reaction of alkylation agent with the halogenated version of the catalyst precursor. For example, bis(cyclopentadienyl)zirconium dichloride can be treated with triisobutylaluminum (TIBA) and then combined with activator composition:

Polymerization Using Activator Compositions of This Invention

When using activator compositions of the present invention in polymerization, any, olefin or dioelfin having 2 to 20 carbon atoms can be used as a monomer for polymerization. Specific examples thereof include ethylene, propylene, butene-1, pentene-1, hexene-1, heptene-1, octene-1, nonene-1, decene-1, hexadecene-1, eicocene-1, 4-methylpentene-1, 5-methyl-2-pentene-1, vinylcyclohexane, styrene, dicyclopentadiene, norbornene, 5-ethylidene-2-norbornene and the like, but are not limited thereto. In the present invention, copolymerization can be conducted using two or more monomers, simultaneously. Specific examples of the monomers constituting the copolymer include ethylene/an α olefin such as ethylene/propylene, ethylene/butene-1, ethylene/hexene-1, ethylene/propylene/butene-1, ethylene/propylene/5-ethylidene-2-norbornene and the like, propylene/butene-1, and the like, but are not limited thereto.

The polymerization method is not limited, and both liquid phase polymerization method and gas phase polymerization method can be used Examples of solvent used for liquid phase polymerization include aliphatic hydrocarbons such as butane, pentane, heptane, octane and the like; aromatic hydrocarbons such as benzene, toluene and the like; and hydrocarbon halides such as methylene chloride and the like. It is also possible to use at least a portion of the olefin to be polymerized as a solvent. The polymerization can be conducted in a batch-wise, semibatch-wise or continuous manner, and polymerization may be conducted in two or more stages which differ in reaction conditions. The polymerization temperature can be from about −50° C. to about 200° C., or from 0° C. to about 100° C. The polymerization pressure can be from atmospheric pressure to about 100 kg/cm$^2$, or from atmospheric pressure to about 50 kg/cm$^2$. Appropriate polymerization time can be determined by means known to those skilled in the art according to the desired olefin polymer and reaction apparatus, and is typically within the range from about 1 minute to about 20 hours. In the present invention, a chain transfer agent such as hydrogen may be added to adjust the molecular weight of olefin polymer to be obtained in polymerization.

Organoaluminum compound can be added during polymerization to remove impurities, such as water. Organoaluminum compound useful herein can comprise a variety of organoaluminum compounds, including at least one currently known organoaluminum compound, for example, organoaluminum compound $R^6{}_cAlY_{3-c}$ (wherein $R^6$ represents a hydrocarbon group having 1 to about 20 carbon atoms; Y represents hydrogen atom and/or halogen atoms; and "c" represents an integer of 0 to 3). Specific examples of $R^6$ include methyl group, ethyl group, n-propyl group, n-butyl group, isobutyl group, n-hexyl group and the like. Specific examples of the halogen atom for Y include fluorine atom, chlorine atom, bromine atom and iodine atom. Specific examples of the organoaluminum compound $R^6{}_cAlY_{3-c}$ include trialkylaluminums such as trimethylaluminum, triethylaluminum, tri-n-propylaluminum, trisobutylaluminum, tri-n-hexylaluminum and the like; dialkylaluminum chloride such as dimethylaluminum chloride, diethylaluminum chloride, di-n-propylaluminum chloride, diisobutylaluminum chloride, di-n-hexylaluminum chloride and the like; alkylaluminum dichlorides such as methylaluminumdichloride, ethylaluminum dichloride, n-propylaluminum dichloride, isobutylaluminum dichloride, n-hexylaluminum dichloride and the like; and dialkylaluminum hydrides such as dimethylaluminum hydride, diethylaluminum hydride, di-n-propylaluminum hydride, diisobutylaluminum hydride; di-n-hexylaluminum hydride and the like.

EXAMPLES

The following examples are illustrative of the principles of this invention. It is understood that this invention is not limited to any one specific embodiment exemplified herein, whether in the examples or the remainder of this patent application.

Example 1

Structures of Hydroxyl Groups on Silica

This example compares the differences of silica calcined at low (<400° C.) and high (>400° C.) temperatures. Three raw silica (Grace 952) samples, each containing about 800 g in a steel beaker, were heated in an oven for 4 hours at 150° C., 200° C., and 600° C., respectively. Subsequently, each sample was allowed to cool and was maintained at 100° C. before being transferred into a drybox under nitrogen protection. Each of the three samples was then analyzed by FT-IR spectroscopy. Their proton-stretching frequency regions are shown in FIG. 1.

Si—OH species on silica surface are mainly in isolated (C) and hydrogen bonded (D) forms, which can be identified by infrared (IR) spectroscopy.

(IR frequency assignment by Lenza and Vasconcelos, *Materials Research*, 4 (2001) 189)

Figure 1:
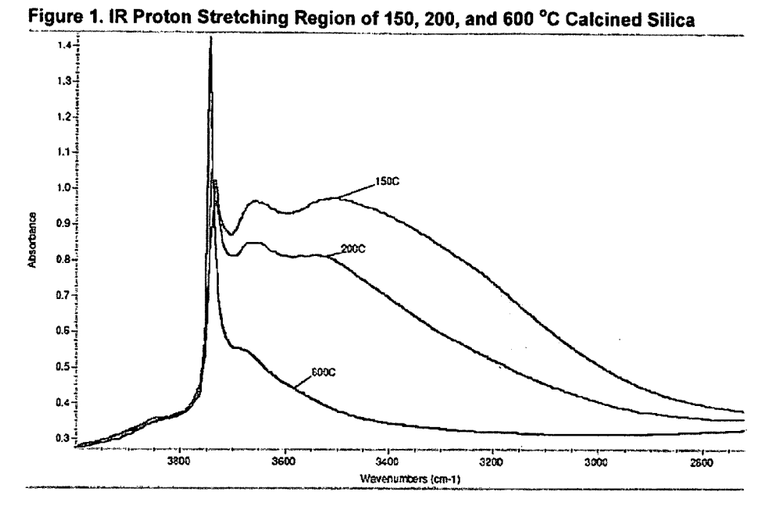
FIG. 1 shows the OH regions of three IR spectra: (i) spectrum of silica treated at 150° C., (ii) spectrum of silica treated at 200° C., and (iii) spectrum of silica treated at 600° C.

FIG. 1 shows the IR spectra of silica (Grace 952) pretreated at 150° C., 200° C., and 600° C., respectively, in the proton-stretching frequency region. It can be seen that the two silica samples pretreated at 150° C. and 200° C., respectively, contain significantly more hydrogen bonded hydroxyl pairs than the silica sample pretreated at 600° C. Coordinated molecular water was also observed for the two silica samples pretreated at lower temperatures, showing as a broad peak at 3540 cm$^{-1}$ (also assigned by Lenza and Vasconcelos, *Materials Research*, 4 (2001) 189). To avoid the influence of aluminoxane formed by the reaction of organoaluminum compound with the coordinated water, the silica sample containing less coordinated water, i.e., the silica pretreated at 200° C., was used for studies. Schrijnemakers and co-workers have quantified the amounts of isolated (C) and hydrogen bonded (D) hydroxyl groups on different temperature calcined silica samples (Phys. Chem. Chem. Phys, 1 (1999) 2569, where the isolated and hydrogen bonded hydroxyl groups are called free and bridged hydroxyl groups, respectively). For example, a silica sample pretreated at 473° C. contains a C:D ratio of 1.0:3.7, the same silica pretreated at 573° C. contains a C:D ratio of 2.6:1.5, and the same silica pretreated at 973° C. contains a C:D ratio of 1.05:0.05. The conclusion from experimental results is that in silica calcined at <400° C., the hydrogen bonded hydroxyl groups are dominant on the silica surface.

Example 2

The Construction of Chelating Aluminum Centers Using the Hydrogen Bonded Hydroxyl Groups on Carrier as the Chelating Agent Non-chelating anion containing a boron or aluminum center in a catalytic ion-pair has been found to be unstable and to cause deactivation either in a solution phase (e.g., Marks et al, *Organometallics,* 19 (2000) 1625) or on silica surface (e.g., Basset et al, *J. Am. Chem. Soc.,* 128 (2006) 9361). This Example 2 shows how to maximize the amount of chelating aluminum centers on the silica surface by using Lewis Base (e.g., a tertiary amine) to treat an organoaluminum treated, low temperature calcined silica where a majority of hydroxyl groups are in hydrogen bonded form. The resulting product can be used as the precursor of a chelating aluminate anion in a catalyst-ion-pair to construct a much more stable silica supported Bronsted acidic activator system.

2-1. Determination of TEA Reactive OH Content on 200° C. Calcined Silica and Measurement of Al-Et:Al Ratio on TEA Treated Silica to Quantify Chelating Aluminum Content The organoaluminum compound, e.g., $AlEt_3$, can react with a pair of hydrogen bonded hydroxyl groups on the carrier surface and lose two of its three ethyl groups, resulting in formation of a chelating aluminum structure containing only one ethyl group on the aluminum. Theoretically, matching one equivalent of organoaluminum compound to two equivalents of hydrogen bonded hydroxyl groups should result in all aluminum atoms being in chelating form. However, silica calcined at 150-200° C. still contains a significant amount of isolated OH groups that consume an equal mole of the organoaluminum compound. To ensure no unreacted OH groups are left on the surface, a stoichiometric excess charge greater than a 1:2 ratio of Al:OH is required. Therefore, with the stoichiometric excess organoaluminum compound treatment, instead of every pair of hydrogen bonded hydroxyl groups sharing one aluminum center to form a di-substituted (or chelating) organoaluminum compound derivative, some pairs of the hydrogen bonded hydroxyl groups can each react with two organoaluminum compound, e.g., $AlEt_3$, to form two mono-substituted organoaluminum compound derivatives, i.e., losing only one ethyl group for each $AlEt_3$. The ratio of Al-Et:Al on the carrier surface is therefore increased to become significantly greater than 1:1. The Al-Et:Al ratio can thus be considered as a gauge to measure aluminum atoms in chelating form, i.e., the closer to 1:1 the Al-Et:Al ratio, the more aluminum atoms in chelating form.

2-1-1. Preparation of Excess TEA Treated Silica

Silica Grace 952 after 200° C. calcination (2.50 g) was weighed into a 20 mL vial and mixed with dry toluene (5 g). The slurry was agitated. Triethylaluminum (TEA 1.003 g (8.78 mmol, based on 3.52 mmol/g $SiO_2$ charge) was weighed into a small vial and mixed with dry toluene (2 g). The TEA solution was then slowly added to the silica slurry. After agitating at ambient conditions overnight, the reaction mixture was filtered, washed twice with toluene (2 g), washed with isohexane (4 g), and dried under vacuum to constant weight. The dry, free flowing powder was 3.2688 g (Solid A) and the combined weight of solvents after filtration and washes was 14.057 g (Solution B).

2-1-2. Determination of Al-Et:Al Ratio in TEA Treated Silica
2-1-2-a Aluminum Content The Al content determined for Solid A by ICP was 4.22%, corresponding to 3.2688 g (Solid A)(4.22%)/(27 g/mol)(2.50 g)=2.04 mmol Al/(g silica). TEA content in Solution B determined by quantitative NMR analysis was 3.48 mmol. The TEA consumed by silica was 8.78−3.48=5.30 mmol or 5.30/2.50=2.12 mmol Al/(g silica), very close to the ICP result. This is a verification of the Al content.

2-1-2-b Et Residue on Aluminum

The content of Al-Et units on TEA treat silica was quantified with $CF_3COOH$-NMR titration in a sealed system, giving 2.19 (mmol OH)/(g TEA treated silica), corresponding to (2.19)(3.2688)/2.50=2.86 (mmol OH)/(g silica). Therefore, the excess TEA treated silica has a Al-Et:Al ratio=2.86:2.04=1.40:1 (mol:mol), indicating 40 mol % of Al has two Et groups. Al content from ICP was used for calculation because it was a direct result from the final product. The fact that there are 40 mol % of Al with two ethyl groups suggests that these Al are mono-substituted and, therefore, not in chelating form.

Details of the $CF_3COOH$-NMR titration procedures are as follows: A specially designed NMR tube consisting of an upper chamber and a TEFLON cap was used. The upper chamber is so designed that when the $CF_3COOH$ solution is loaded in the chamber, there is no contact between the $CF_3COOH$ solution and the organoaluminum treated silica slurry in the lower part of the NMR tube. Then the tube is turned upside down to allow the two reagents to come into contact and react. In the drybox, exact amounts of both trialkylaluminum treated silica and an internal standard such as 1,2-diphenylethane (DPE) are weighed into the lower part of the NMR tube. Then a deuterated solvent such as $C_6D_6$ is loaded in the NMR tube in such a way that the possible head-space is reduced; this is done to minimize error caused by gas escaping from the solution to the head-space. Then, an excess amount of $CF_3OOH$ solution in the same deuterated solvent is loaded in the upper chamber. The NMR tube is then sealed with the TEFLON cap. The NMR tube is then turned upside down to allow the contact of the two reagents, followed by vigorous shaking for 10 minutes and then settling for 60 minutes. During the 60 minute period of time, $^1H$-NMR is checked occasionally to ensure that there is no additional formation of alkane (e.g., for TEA treated silica, ethane). With known amounts of both organoaluminum treated silica and the internal reference, the Al—R content can be calculated. This analytical method gives a 95% or better confidence for ethane and isobutane released from the reaction of Al-Et and Al—$^iBu$ fragments on silica with $CF_3COOH$, respectively.

2-1-3. Determination of TEA Reactive OH Content on 200° C. Calcined Silica

OH content is measurement method dependent. For example, while the physical treatment method such as LOI (Loss on ignition) gives a higher OH content because both the OH groups under the surface and on the surface can lose water through heating treatment, the chemical reaction method only measures the surface OH groups and thus gives a lower OH content. Furthermore, the surface OH groups located in different pore sizes of silica are also sensitive to the steric bulkiness of the chemical reagent, i.e., a larger chemical reagent can only react with OH groups in a larger size pore, giving an even lower OH content. For example, the LOI method gave about 4 mmol OH/g silica, the TEA-NMR titration gave about 3.26 mmol OH/g silica, and the benzyl Grignard-NMR titrations gave only about 2.03 mmol OH/g silica for the same silica calcined at 200° C. Because TEA is used as the reagent to construct the activator species, OH content determined by TEA-NMR titration is used in this application. The OH content determined, by TEA-NMR titration is thus called TEA reactive OH content.

In Example 2-1-2, the TEA treated silica contains 2.04 mmol Al/(g silica) and 2.86 mmol Al-Et/(g silica). All the Al are from the TEA. Therefore, the TEA reactive OH content should equal the loss of Et groups from TEA, and can be derived:

TEA reactive OH=(2.04)(3)−2.86=3.26 (mmol OH)/(g silica)

Therefore, on the surface of the 200° C. calcined Grace 952 silica, there are 3.26 mmol OH/(g silica), which are TEA reactive.

2-2. Al-Et:Al Ratio on Excess TEA Treated Silica After Lewis Base Treatment

This example shows how the Lewis base can convert most of the 40% non-chelating aluminum to chelating form by removal of the excess organoaluminum compound.

The Lewis base used in this experiment is $PhNMe_2$. $PhNMe_2$ (0.482 g, 3.95 mmol) in toluene (2 g) was added to TEA treated silica from Example 2-1-1 (Solid A, 1.476 g, containing 2.31 mmol Al) in toluene (5 g). Then the slurry was heated in a 70° C. oil-bath for 1 hr while agitating. The slurry was then filtered, washed twice with 2 g toluene and once with 4 g isohexane, and dried under vacuum for 1 hr, giving 1.298 g free-flowing powder (Solid A'). The combined filtrate and washes 6.838 g (Solution B') were analyzed with NMR, giving a total 0.39 mmol TEA in the Solution B', corresponding to 0.39 (mmol TEA)/1.476 (g Solid A)=0.264 (mmol TEA)/(g Solid A); 0.264 (mmol TEA)/(g Solid A)×3.2688 (g Solid A)/2.50 (g $SiO_2$)=0.345 mmol/(g $SiO_2$) of TEA that was washed off from the excess TEA treated silica.

Similar analyses of ICP and CF3COOH titration in Example 2-1 for Al and Al-Et contents for Solid A' gave a 1.08:1 (mol:mol) of Al-Et:Al ratio. The final Al:Et:Al ratio of 1.08:1 suggests that more than 90 mol % of Al are now in the chelating form and that the isolated Si—OH (C) is estimated as not higher than 8 mol % based on total TEA reactive OH groups.

Example 3

Preparation of Final Supported Catalyst From Excess TEA Treated Silica With and Without Lewis Base Treatment

Silica Grace 948 calcined at 200° C. for four hours was used for the studies. Grace 948 silica was also analyzed with methods similar to Example 2. The TEA reactive OH content was determined to be 3.21 (mmol OH)/(g silica).

3-1. Preparation of Excess TEA Treated Silica

In the drybox, silica Grace 948 from calcination at 200° C. for four hours (20.0 g, containing total 20×3.21=64.2 mmol TEA reactive OH) was slurried into toluene (75 g) in a 250 mL three-neck round bottom flask equipped with a mechanical stirrer. TEA (5.0 g, 43.7 mmol or 43.7×3=131.1 mmol Al-Et) and toluene (15 g) were charged into a 50 mL beaker. The TEA solution was then slowly added to the silica slurry with agitation. The mixture was allowed to agitate at ambient conditions for 30 min, followed by heating at 70° C. for 2 hr in an oil-bath. The stirrer was stopped and the mixture was allowed to cool to ambient. The mixture was then filtered through a coarse frit, washed 3 times with 10 g toluene and once with 10 g isohexane, and dried under vacuum overnight. Yield: 22.7 g (Al: 4.1% by ICP; Toluene: 1.3% by NMR; Net weight: 22.4 g). The combined filtrate and washes were analyzed by quantitative NMR analysis and showed a total excess of TEA in the solution of 1.04 g. An Al-Et:Al ratio of 1.4:1.0 was obtained through a $CF_3COOH$-NMR titration analysis. Both, Al % and Al-Et:Al ratio agree with the results derived from the starting material weights and the final product weight. Details are as follows: The weight of TEA fragments on the TEA treated silica was 22.4 g product−22.0 g silica=2.4 g. The total TEA consumption=5.0 g charge−1.04 g excess=3.96 g consumed. The consumed TEA contains (27)(3.96)/114.2=0.936 g Al (Al atom weight 27 g/mol and TEA molecular weight 114.2 g/mol). Therefore, Al %=0.936/22.4=4.17%. The consumed 3.96 g of TEA ($AlEt_3$) became 2.4 g ($AlEt_x$) (TEA fragments) on silica due to the loss of Et groups. The x of the $AlEt_x$ fragment was calculated as 1.43 (Et portion is 2.4 g $AlEt_x$−0.936 g Al=1.464 g, or 1.464/29=0.050 mol (the Et group is 29 g/mol). Al=0.936/27=0.035 mol. Therefore, Al:Et=0.035:0.050=1:1.43)

3-2. Preparation of Supported Catalyst From Excess TEA Treated Silica Without Lewis Base Treatment (Comparative Example)

The final catalyst preparation consists of three steps: 1) the preparation of an ionic Bronsted acid (IBA) (according to Reaction 1); 2) the construction of a supported Bronsted acidic activator A (according to Reaction 2); and 3) the activation of an alkylated metallocene with the supported activator A to form the final catalyst B (according to Reaction 3).

3-2-1. Preparation of Supported Bronsted Acidic Activator

In the drybox, TEA treated silica (1.05 g, containing 1.59 mmol Al/g) from Example 3-1 was mixed with 3.0 g toluene in a 20 mL vial. $C_6F_5OH$ (0.250 g, 1.36 mmol) and $PhNMe_2$

(0.083 g, 0.68 mmol) were charged into a 4 mL vial with toluene (1 g) to form ionic Bronsted acid (IBA) (see Reaction 1). The IBA solution was then added to the TEA treated silica slurry slowly, followed by shaking on a shaker for 1 hr. The resulting mixture was then filtered and washed with toluene (3 g), and dried under vacuum for 30 seconds.

3-2-2. Preparation of Supported Catalyst

The wet solid from Example 3-2-1 was slurried into toluene (3 g). A commercially available bis(dialkyl substituted cyclopentadienyl)zirconium dimethyl solution (0.133 g, 19.6% in toluene, 66.6 μmol Zr) was then added at once to the slurry, followed by shaking on a shaker for 1 hr. The orange mixture was filtered, washed twice with 3 g toluene and once with 5 g isohexane, and dried under vacuum for 30 min. Yield: 1.10 g (Al: 3.13% and Zr: 0.46% from ICP). The solid was tested for ethylene polymerization based on the procedure described in Example 5 and the results are listed in Table 1 Entry 1.

3-3. Preparation of Supported Catalyst From Excess TEA Treated Silica With Lewis Base Treatment (Invention Example)

This example used PhNMe2 as the Lewis base to treat the TEA treated silica. After the PhNMe$_2$ treatment, part of this compound remained on the TEA treated silica surface (as shown as D' in Reaction 4). Construction of the supported Bronsted acidic activator A (as shown in Reaction 5) was done by adding C$_6$F$_5$OH. Use of the IBA compound was not needed.

3-3-1. Preparation of Supported Bronsted Acidic Activator 3-3-1-a. Treatment of Excess TEA Treated Silica With PhNMe$_2$ In a drybox, TEA treated silica (3.04 g) from Example 3-1 was charged with toluene (10 g) in a 20 mL vial. PhNMe$_2$ (0.36 g, 3.0 mmol) was added at once to the TEA treated silica slurry with agitation, followed by heating at 75° C. in an oil-bath for 1 hr. The mixture was then filtered, washed 3 times with 3 g toluene and once with 6 g isohexane, then dried under vacuum for 1 hr. Yield: 3.34 g (wet).

3-3-1-b. Preparation of Supported Bronsted Acidic Activator

The wet solid from Example 3-3-1-a was divided into three equal portions P1, P2 and P3 (1.11 g for each). P1 and P2 were used for catalyst preparation while P3 was saved for other use.

To P1 and P2 each in a 20 mL vial was charged toluene 4 g, respectively. Then the C$_6$F$_5$OH solutions (0.19 g or 1.03 mmol in 1 g toluene for P1 and 0.28 g or 1.52 mmol in 2 g toluene for P2) were added slowly to P1 and P2, respectively. The resulting mixtures were shaken on a shaker for 1 hr. Then each of the two samples was filtered, washed with 3 g toluene, and dried under vacuum for 30 seconds, resulting in two wet solid samples: Q1 from P1; and Q2 from P2.

Figure 2:
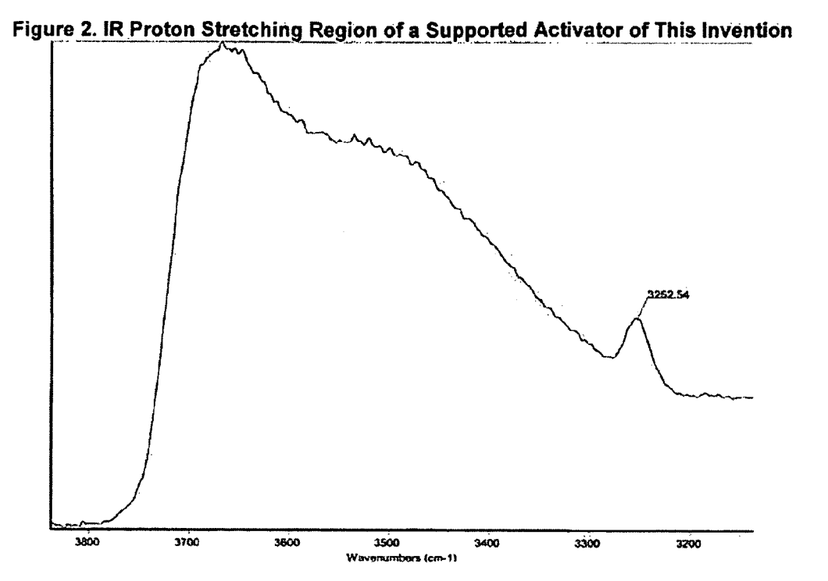
FIG. 2 shows the OH and NH regions of an IR spectrum of an activator composition derived according to this invention.

In this step, we have found that the ratio of the total C$_6$F$_5$OH to Al on silica can be much less than 2:1 (the theoretical ratio of structure A in Reaction 2) to form a desired amount of activator species A. In this example, even with a higher C$_6$F$_5$OH charge for P2, the ratio is 1.52 mmol C$_6$F$_5$OH:1.54 mmol Al (based on 4.2% Al from ICP that gives 1.54 mmol Al/g silica), which is close to 1:1 only. By use of IR spectroscopy analysis, the formation of the Bronsted acidic activator having a N—H stretching frequency at 3252 cm$^{-1}$ can be clearly seen (FIG. 2). And with CF$_3$COOH-NMR titration, both Al-Et and Al—OC$_6$F$_5$ units can be detected and quantified. More than 50% of Al-Et remains after C$_6$F$_5$OH treatment, showing that species A and D' coexist in the system.

3-3-1-c. Preparation of Supported Bronsted Acidic Activator for IR Analysis

A similar preparation based on procedures in Examples 3-3-1-a and 3-3-1-b was used to prepare an IR sample, which was vacuum dried to constant weight and analyzed by FT-IR spectroscopy to obtain an IR spectrum shown as FIG. 2 in the proton stretching region. FIG. 2 clearly shows a N—H stretching frequency at about 3252 cm$^{-1}$, indicating the formation of the activator A.

3-3-2. Preparation of Supported Catalysts 3-3-2-a. Preparation of Supported Catalysts for Polymerization Tests The two wet solid samples Q1 and Q2 from Example 3-3-1b were slurried with toluene (3 g for each) in a 20 mL vial, respectively. To each of the slurries was added a commercially available bis(dialkyl substituted cyclopentadienyl) zirconium dimethyl solution (0.128 g, 19.6%, 64 micromol Zr), followed by shaking on a shaker for 1 hr. Each of the two samples was filtered, washed three times with 3 g toluene and once with 3 g isohexane, then dried under vacuum for 1 hr, giving a free flowing a solid R1 from Q1. 1.03 g (Al: 2.88% and Zr: 0.50% from ICP) and a free flowing solid R2 from Q2 1.08 g (Al: 2.80% and Zr 0.50% from ICP). The two samples were tested for ethylene polymerization based on procedures given in Example 5. The results are listed in Table 1 (R1 in Entry 2 and R2 in Entry 3).

3-3-2-b. Preparation of Supported Catalyst for IR Analysis

Figure 3:
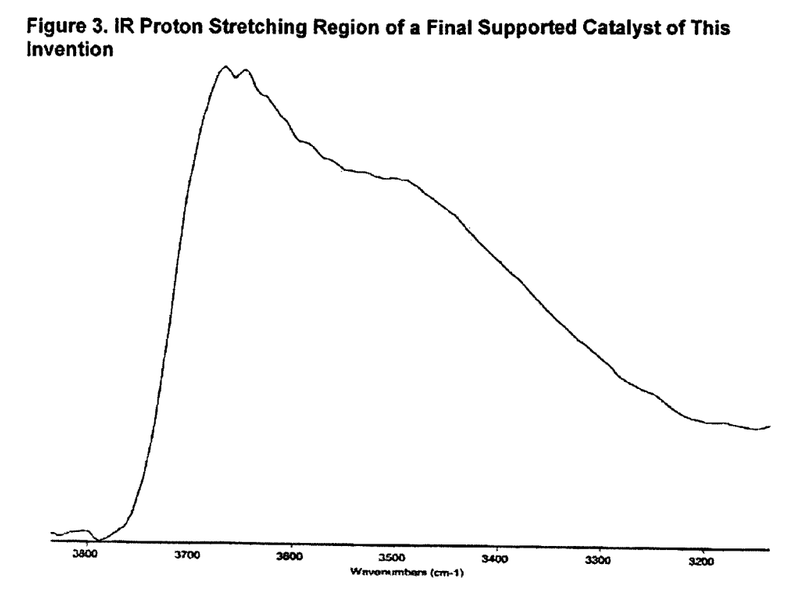
FIG. 3 shows the OH and NH regions of an IR spectrum of a supported catalyst based on an activator composition derived according to this Invention.

A solid from Example 3-3-1-c was used to prepare a final catalyst based on procedures in Example 3-3-2-a and the resulting supported catalyst solid was analyzed by FT-IR spectroscopy. The proton-stretching region is shown as FIG. 3. Comparing to FIG. 2, it can be clearly seen that the N—H stretching frequency has diminished, indicating that the reaction of an alkylated metallocene and the active proton on PhNMe$_2$ of the activator A has occurred to generate the active catalyst B. NMR analysis of the supernate from the reaction of the activator A with an alkylated metallocene in a sealed system also detected more than 90 mol % of methane formation based on the metallocene charge, further confirming the Bronsted acid activation as the major activation pathway for this system.

3-4 Preparation of Supported Catalyst From Excess TEA Treated Silica With Lewis Base Treatment (Invention Example) on a Larger Scale In the drybox, excess TEA treated silica from Example 3-1 (15.4 g, containing 4.1% Al) was mixed with toluene (64 g) in a 250 mL three-neck round bottom, flask equipped with a mechanical stirrer. PhNMe$_2$ (1.9 g, 15.6 mmol) was added at once to the TEA treated silica slurry with agitation. The resulting mixture was agitated at ambient conditions for 3 min, then heated at 70° C. in an oil-bath for 1 hr. The mixture was then filtered, washed with toluene (10 g), and dried under vacuum for 1 hr. Yield: 14.0 g (Al: 3.4%). It can be seen that the amine removed excess TEA therefore the mass was reduced from 15.4 g to 14.0 g. The Al % was also reduced accordingly.

The amine treated solid was reslurried into 43 g toluene, followed by agitating at ambient conditions. C$_6$F$_5$OH (3.1 g, 16.8 mmol, or 0.24 g/g) was mixed with toluene (6 g) in a 20 mL vial and slowly added to the amine treated solid. The mixture was agitated for 1.2 hr at ambient. Then it was filtered, washed with toluene (10 g), and dried under vacuum for 3 hr. The solid was reslurried to toluene (35 g). Then a commercially available bis(dialkyl substituted cyclopentadienyl) zirconium dimethyl solution (1.34 g, 19.6% in toluene, containing 671 micromol Zr) was added to the slurry with agitation. The mixture was allowed to agitate at ambient conditions for 1 hour, and then placed at ambient conditions overnight. The mixture was then filtered, washed with toluene (15 g) twice and isohexane (15 g) twice, and dried under vacuum for 2 hr. Yield: 16.4 g (Al: 2.9% and Zr: 0.23% from ICP). The PE polymerization test was carried out based on procedures given in Example 5 and the results are listed in Table 1 Entry 4.

Example 4

More Comparative Examples 4-1 Preparation of Supported Catalyst from Stoichiometric Control of TEA Treated Silica without Lewis Base Treatment The same silica Grace 952 after 200° C. calcination for 4 hours as used in Examples 1 and 2 was used in this example. In the dry box, silica (21.3 g, 69.4 mmol TEA reactive OH) was charged with toluene (90.8 g) in a 250 mL three-neck round bottom flask equipped with a mechanical stirrer. Based on the TEA reactive OH content 3.26 (mmol OH)/(g silica) (see Example 2-1-3), TEA (4.2 g, 36.8 mmol, 53 mol % of TEA reactive OH content) was mixed with toluene (12 g) and then slowly added to the silica slurry with agitation. After agitation at ambient conditions for 30 min, the reaction temperature was brought to 70° C. with an oil-bath for 2 hours. The mixture was allowed to cool to ambient temperature, then filtered through a coarse frit, washed with toluene (10 g) three times and isohexane (20 g), then dried under vacuum for 3 hr. Yield: 23.9 g (Al: 4.15% from ICP; Et:Al=1.17:1.0 from combined NMR and ICP analyses); Quantitative NMR analysis for the combination of supernate and washes gave total 0.051 g TEA (1.2% of 4.2 g charge).

In the drybox, TEA treated silica from Example 4-1-1 (1.0 g, containing 1.53 mmol Al) was charged in a 20 mL vial with toluene (4 g). C$_6$F$_5$OH (0.24 g, 1.30 mmol) and PhNMe$_2$ (0.080 g, 0.655 mmol) was mixed with toluene (1 g) in a 4 mL vial (IBA formation, see Reaction 1). The IBA solution was then slowly added to the TEA treated silica slurry with agitation. The mixture was then shaken on a shaker for 1 hr. The mixture was then filtered, washed with toluene (3 g), and dried under vacuum for 30 seconds (Activator formation, see Reaction 2). The wet solid was then reslurried into toluene (3 g). Commercially available bis(dialkyl substituted cyclopentadienyl)zirconium dimethyl solution (0.144 g, 19.6% toluene solution, 72 micromol) was added to the slurry, followed by shaking for 40 min (Final catalyst formation, see Reaction 3). The red brown mixture was then filtered, washed with toluene (3 g) three times and isohexane (5 g), and dried under vacuum for 2 hr. Yield: 1.20 g (Al: 3.30% and Zr: 0.52% from ICP). The PE polymerization test was carried out based on procedures in Example 5 and the results are listed in Table 1 Entry 5.

4-2 Preparation of Supported Catalyst From Excess TEA Treated Silica With C$_6$F$_5$OH as Lewis Base and Bronsted Acid This example shows that the Bronsted acidic C$_6$F$_5$OH can also function as a Lewis base to remove the excess Al off the carrier to maximize chelating Al content.

In the drybox, 200° C. calcined Grace 948 silica used in Example 3 (1.0 g, containing 3.21 mmol OH) was charged with toluene (3 g) in a 20 mL vial. TEA (0.25 g, 2.2 mmol) in toluene (1 g) prepared in a 4 mL vial was slowly added to the silica slurry with agitation. The mixture was then heated at 70° C. in an oil-bath for 2 hr. The mixture was then filtered, washed with toluene (3 g), and dried under vacuum for 30 seconds. The wet solid was reslurried into toluene (3 g). C$_6$F$_5$OH (0.26 g, 1.41 mmol) was mixed with toluene (1 g) in a 4 mL vial. The C$_6$F$_5$OH solution was then slowly added to the TEA treated silica slurry with agitation. The mixture was then shaken on a shaker for 1 hr. The mixture was then filtered, washed with toluene (3 g), and dried under vacuum for 30 seconds. The NMR analysis for the combination of filtrate and washes shows that excess Al was removed from the carrier in the form of H$_{(x-3)}$Al(OC$_6$F$_5$)$_x$ (x=3 or 4).

The wet solid was then reslurried into toluene (3 g). Commercially available bis(dialkyl substituted cyclopentadienyl) zirconium dimethyl solution (0.131 g, 19.6% toluene solution, 66 micromol) was added to the slurry, followed by shaking for 1 hr. The mixture was then filtered, washed with toluene (4 g) two times and isohexane (5 g), and dried under vacuum for 2 hr. Yield: 1.08 g (Al: 3.0% and Zr: 0.27% from ICP). The PE polymerization test was carried out based on procedures in Example 5 and the results are listed in Table 1 Entry 6.

4-3 Preparation of Supported Catalyst From Excess TEA Treated Silica With C$_6$F$_5$OH as Lewis Base and Bronsted Acid with Silica Calcined at 600° C.

The procedures and chemical charges were similar to Example 4-2 except the silica (Grace 948) was calcined at 600° C. for 4 hr. The PE polymerization test was carried out based on procedures in Example 5 and the results are listed in Table 1 Entry 7.

Example 5

Ethylene Polymerization Tests 5-1 Procedures and Results

The dried 4 L reactor was heated to 85° C. under low-pressure nitrogen flow. The reactor was pressured with isobutane and vented three times to remove nitrogen. After 1000 ml of isobutane was charged into the reactor, the reactor agitator was set at 800 rpm. After the stabilization of temperature, ethylene was charged into the reactor up to 325 psi. Then 120 ml of dried 1-hexene was charged, followed by 500 ml of isobutane. Next, 2 ml of 10% TIBA was added as scavenger agent. Typically 100 mg of solid catalyst was slurred in 2 ml of hexane (with or without 0.3 g 10% TIBA) in a glovebox and then injected into the reactor, followed by another 500 ml of isobutane. The reaction pressure was maintained at 325 psi and the reaction was conducted for 60 minutes at 85° C. The reaction was stopped and isobutane was vented. The polymer was dried and weighed. The polymerization productivity of each catalyst was calculated and listed in Table 1.

TABLE 1

| Entry | Example ID | Al (%) | Zr (%) | Component Charge g/(g TEA/SiO$_2$) $C_6F_5OH$ | PhNMe$_2$ | Productivity (g/g cat/hr) | Reactor Fouling |
|---|---|---|---|---|---|---|---|
| 1 | 3-2-2 (comparative) | 3.13 | 0.46 | 0.25[1] | 0.083[1] | 1,700 | Yes |
| 2 | 3-3-2-a R1 | 2.88 | 0.50 | 0.19 | 0.12 | 2,430 | No |
| 3 | 3-3-2-a R2 | 2.80 | 0.50 | 0.28 | 0.12 | 3,400 | No |
| 4 | 3-4 | 2.90 | 0.23 | 0.24 | 0.12 | 3,000-4,000 | No |
| 5 | 4-1 (comparative) | 3.30 | 0.52 | 0.24[2] | 0.080[2] | 3,000 | No |
| 6 | 4-2 (comparative) | 3.00 | 0.27 | 0.25 | 0 | 1,500 | No |
| 7 | 4-3[3] (comparative) | 2.38 | 0.13 | 0.25 | 0 | 300 | Yes |

[1] The amounts shown are the amounts of each used to make the IBA compound (see detailed description);
[2] The amounts shown are the amounts of each used to make the IBA compound (see detailed description);
[3] Silica was from 600° C. calcination 5-2. Discussion on Data in Table 1

Comparing Entries 1, 2, and 3, the Lewis base treatment effect is shown. Without the amine treatment of this invention, the resulting catalyst not only had a lower productivity, but also caused reactor fouling to give poor polymer morphology (Entry 1). With the amine treatment of this invention, even though the $C_6F_5OH$ charge was significantly less as compared to Entry 1, the resulting catalyst performed better and produced polymer with good morphology (Entry 2). Increase of the $C_6F_5OH$ charge as compared to Entry 1 further improves catalyst performance (Entry 3). Entry 4 is similar to Entries 2 and 3 with a lower Zr loading (0.23% vs. 0.50%). The Example of Entry 5 shows results when TEA was controlled to dose to a 1:2 match of Al:OH; the Example of Entry 6 shows results without amine; and the Example of Entry 7 shows results from use of a 600° C. calcined silica, which contains OH groups dominant in isolated form.

The above examples show that construction of chelating Al centers to form the Bronsted acidic activators for metallocenes result in compositions with good, catalytic performance. Hydrogen bonded hydroxyl groups are required for the construction of such chelating aluminum structures. However, the amount of organoaluminum can also be controlled so that the Al:OH ratio is close to 1:2 either through the Lewis base treatment or by controlling the charge of the organoaluminum compound, which results in a majority of Al species being in the chelating form.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a mixture to be used in conducting a desired reaction. Accordingly, even though the claims hereinafter may refer to substances, components and/or ingredients in the present tense ("comprises", "is", etc.), the reference is to the substance, component or ingredient as it existed, at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof.

While the present invention has been described in terms of one or more preferred embodiments, it is to be understood that other modifications may be made without departing from the scope of the invention, which is set forth in the claims below.

What is claimed is:

1. A composition derived from at least:
   a) a compound derived from at least (i) a carrier having at least one pair of hydrogen bonded hydroxyl groups, (ii) an organoaluminum compound, and (iii) a Lewis base, such that each of a majority of aluminum atoms in the organoaluminum compound forms chemical bonds with at least two oxygen atoms from the at least one pair of hydrogen bonded hydroxyl groups; and
   b) a Bronsted acid, wherein the molar ratio of the Bronsted acid to the organoaluminum compound is less than or equal to about 2:1.

2. The composition of claim 1 wherein the carrier comprises a plurality of hydroxyl groups and a majority of the hydroxyl groups are in hydrogen bonded form.

3. The composition of claim 1, wherein the carrier comprises an inorganic oxide.

4. The composition of claim 3, wherein the inorganic oxide has a micro pore volume of not less than about 0.3 ml/g and an average particle diameter of about 10 micrometers to about 500 micrometers.

5. The composition of claim 3 wherein the inorganic oxide comprises silica, alumina, silica-alumina, magnesia, titania, zirconia, or clays.

6. The composition of claim 3 wherein the inorganic oxide comprises silica.

7. The composition of claim 6 wherein the silica is non-calcined.

8. The composition of claim 1 wherein the carrier was calcined at a temperature up to 400° C.

9. The composition of claim 1 wherein the carrier was calcined at a temperature of about 100° C. to about 400° C.

10. The composition of claim 1 wherein the organoaluminum compound comprises $AlR_n(XR^1)_{(3-n)}$ wherein Al is aluminum;

each R is hydrogen or a hydrocarbyl group having up to about 20 carbon atoms, and each R may be the same as, or different from, any other R;

for each $XR^1$, X is a hetero atom and $R^1$ is an organic group bonded to the Al through the hetero atom and having up to about 20 carbon atoms;

each $XR^1$ may be the same as, or different from, any other $XR^1$; and n is 1, 2, or 3.

11. The composition of claim 1 wherein the organoaluminum compound comprises triethylaluminum, triisobutylaluminum, trimethylaluminum, trioctylaluminum, diisobutylaluminum hydride, diethylaluminum hydride, dimethylaluminum hydride, (2,6-di-tert-butyl-4-methylphenoxy)diisobutylaluminum, bis(2,6-di-tert-butyl-4-methylphenoxy)isobutylaluminum, (2,6-di-tert-butyl-4-methylphenoxy)diethylaluminum, bis(2,6-di-tert-butyl-4-methylphenoxy)ethylaluminum, (2,6-di-tert-butyl-4-methylphenoxy)dimethylaluminum, or bis(2,6-di-tert-butyl-4-methylphenoxy)methylaluminum.

12. The composition of claim 1 wherein the Lewis base comprises a tertiary amine $NR^4_3$, wherein each $R^4$ is hydrogen or hydrocarbyl group having up to about 20 carbon atoms, and each $R^4$ may be the same as, or different from, any other $R^4$.

13. The composition of claim 1 wherein the Lewis base comprises N,N-dimethylaniline, N,N-dimethylbenzylamine, triethylamine, or trimethylamine.

14. The composition of claim 1 wherein the Bronsted acid comprises pentafluorophenol, 2,6-difluorophenol, or 4-fluorophenol.

15. The composition of claim 1, wherein the composition is suitable for activating an alkylated transition metal component by protonation.

16. A catalyst composition for olefin polymerization, wherein the catalyst composition is prepared by combining at least a composition according to claim 1 and an alkylated transition metal component.

17. A method of preparing a composition comprising combining at least:

a) a compound derived from at least (i) a carrier having at least one pair of hydrogen bonded hydroxyl groups, (ii) an organoaluminum compound, and (iii) a Lewis base, such that each of a majority of aluminum atoms in the organoaluminum compound forms chemical bonds with at least two oxygen atoms from the at least one pair of hydrogen bonded hydroxyl groups; and b) a Bronsted acid, wherein the molar ratio of the Bronsted acid to the organoaluminum compound is less than or equal to about 2:1.

18. The method of claim 17 wherein the carrier comprises a plurality of hydroxyl groups and a majority of the hydroxyl groups are in hydrogen bonded form.

19. The method of claim 17 wherein the compound and the Bronsted acid are combined in amounts sufficient and under conditions sufficient such that the composition is suitable for activating alkylated transition metal component by protonation.

20. A method of preparing a catalyst for olefin polymerization, comprising combining an alkylated transition metal component with composition derived from at least a) a compound derived from at least (i) a carrier having at least one pair of hydrogen bonded hydroxyl groups, (ii) an organoaluminum compound, and (iii) a Lewis base, such that each of a majority of aluminum atoms in the organoaluminum compound forms chemical bonds with at least two oxygen atoms from the at least one pair of hydrogen bonded hydroxyl groups; and b) a Bronsted acid, wherein the molar ratio of the Bronsted acid to the omanoaluminum compound is less than or equal to about 2:1.

21. A method of polymerizing monomer comprising carrying out such polymerization in the presence of the catalyst composition according to claim 16.

22. A method of polymerizing monomer comprising combining a composition according to claim 1, an alkylated transition metal component, and a monomer.

* * * * *